United States Patent
Gotou et al.

(10) Patent No.: US 12,174,594 B2
(45) Date of Patent: Dec. 24, 2024

(54) CONTROL APPARATUS, CONTROL METHOD, AND RECORDING MEDIUM HAVING CONTROL PROGRAM RECORDED THEREON

(71) Applicant: Yokogawa Electric Corporation, Tokyo (JP)

(72) Inventors: Hirotsugu Gotou, Tokyo (JP); Hiroaki Kanokogi, Tokyo (JP); Yota Furukawa, Tokyo (JP); Keiichiro Kobuchi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 348 days.

(21) Appl. No.: 17/676,863

(22) Filed: Feb. 22, 2022

(65) Prior Publication Data

US 2022/0291643 A1 Sep. 15, 2022

(30) Foreign Application Priority Data

Mar. 10, 2021 (JP) .................. 2021-038601

(51) Int. Cl.
 *G05B 13/02* (2006.01)
 *G05B 23/02* (2006.01)
(52) U.S. Cl.
 CPC ....... *G05B 13/026* (2013.01); *G05B 13/0265* (2013.01); *G05B 23/0283* (2013.01)
(58) Field of Classification Search
 CPC .............. G05B 13/026; G05B 13/0265; G05B 23/0283; G05B 2219/32234; G05B 23/024; G05B 13/042
 See application file for complete search history.

(56) References Cited

U.S. PATENT DOCUMENTS

| | | |
|---|---|---|
| 5,479,358 A | 12/1995 | Shimoda |
| 2004/0267395 A1 | 12/2004 | Discenzo |
| 2014/0012419 A1 | 1/2014 | Nakajima |
| 2015/0160630 A1 | 6/2015 | Makishima |
| 2017/0063276 A1 | 3/2017 | Zhi |
| 2017/0328756 A1* | 11/2017 | Chamberlain ....... G01N 17/008 |

(Continued)

FOREIGN PATENT DOCUMENTS

| | | |
|---|---|---|
| EP | 2172887 A2 | 4/2010 |
| JP | 104131600 A | 5/1992 |

(Continued)

OTHER PUBLICATIONS

Lahiri, Amiya Kumar. "Applied metallurgy and corrosion control." Indian Institute of Metals (ed.) Applied Metallurgy and Corrosion Control 38 (2017) (Year: 2017).*

(Continued)

*Primary Examiner* — Christopher E. Everett

(57) ABSTRACT

Provided is a control apparatus, including a control unit, configured to control a control target by a machine learned control model to output an operation amount of the control target according to a state of equipment having the control target provided therein; a prediction unit, configured to predict a future state of the equipment; an adjusting unit, configured to adjust the operation amount based on a predicted result; and an output unit, configured to output an adjusted operation amount to the control target.

20 Claims, 7 Drawing Sheets

(56) References Cited

U.S. PATENT DOCUMENTS

| | | | |
|---|---|---|---|
| 2018/0354125 A1 | 12/2018 | Ueda | |
| 2019/0292898 A1* | 9/2019 | Quattrone | G05B 13/0265 |
| 2020/0057416 A1 | 2/2020 | Matsubara | |
| 2020/0081411 A1 | 3/2020 | Oho | |
| 2020/0198128 A1 | 6/2020 | Hatanaka | |
| 2020/0301408 A1 | 9/2020 | Elbsat | |
| 2020/0393800 A1 | 12/2020 | Tokuda | |
| 2021/0039972 A1 | 2/2021 | Kawata | |
| 2021/0287157 A1* | 9/2021 | Aditya | G06Q 10/06393 |
| 2021/0317006 A1* | 10/2021 | Salu | C10G 75/02 |

FOREIGN PATENT DOCUMENTS

| | | |
|---|---|---|
| JP | 2012223723 A | 11/2012 |
| JP | 2014014876 A | 1/2014 |
| JP | 2015114778 A | 6/2015 |
| JP | 2017046540 A | 3/2017 |
| JP | 2018202564 A | 12/2018 |
| JP | 2019159876 A | 9/2019 |
| JP | 2020027556 A | 2/2020 |
| JP | 2020042585 A | 3/2020 |
| JP | 2020186417 A | 11/2020 |
| JP | 2021026617 A | 2/2021 |
| JP | 2021117699 A | 8/2021 |

OTHER PUBLICATIONS

Office Action issued for counterpart Japanese Application No. 2021-038601, issued by the Japanese Patent Office on May 16, 2023 (drafted on May 2, 2023).

Extended European Search Report for counterpart European Application No. 22158408.9, issued by the European Patent Office on Jul. 15, 2022.

Office Action issued for counterpart Japanese Application No. 2021-038601, issued by the Japanese Patent Office on Feb. 21, 2023 (drafted on Feb. 14, 2023).

* cited by examiner

CONTROL APPARATUS, CONTROL METHOD, AND RECORDING MEDIUM HAVING CONTROL PROGRAM RECORDED THEREON

The contents of the following Japanese patent application(s) are incorporated herein by reference:
NO. 2021-038601 filed in JP on Mar. 10, 2021

BACKGROUND

1. Technical Field

The present invention relates to a control apparatus, a control method and a recording medium having a control program recorded thereon.

2. Related Art

In Patent Document 1, "performing machine learning on a correction amount of a teaching position of the robot for a disturbance on a motor for driving each joint of the robot; controlling while correcting the teaching position to suppress the disturbance when the robot moves toward the teaching position based on the result of machine learning" is described.

PRIOR ART DOCUMENT

Patent Document

Patent Document 1: Japanese Patent Application Publication No. 2018-202564

SUMMARY (Item 1)
In a first aspect of the present invention, a control apparatus is provided. The control apparatus may include a control unit configured to control a control target by a machine learned control model to output an operation amount of the control target according to the state of the equipment having a control target provided therein. The control apparatus may include a prediction unit configured to predict a future state of the equipment. The control apparatus may include an adjusting unit configured to adjust an operation amount based on the predicted result. The control apparatus may include an output unit configured to output an adjusted operation amount to the control target.

(Item 2)
The prediction unit may predict a future state of health of the equipment. The adjusting unit may adjust the operation amount according to the state of health.

(Item 3)
The state of health may include a remaining thickness of a plumbing in the equipment.

(Item 4)
The prediction unit may predict a future maintenance cost of the equipment. The adjusting unit may adjust the operation amount according to the maintenance cost.

(Item 5)
The maintenance cost may include a cost of adding a suppressant for suppressing deterioration of the equipment.

(Item 6)
The control apparatus may further comprise a learning unit configured to generate the control model by machine learning.

(Item 7)
The learning unit may generate the control model according to an input of state data indicating a state of the equipment by reinforcement learning so that an operation amount with a higher reward value determined by a predetermined reward function is output as a recommended operation amount.

(Item 8)
The learning unit may further learn a constraint condition in the machine learning based on a history adjusted by the operation amount.

(Item 9)
The constraint condition may include at least one of upper or lower limit values of the operation amount.

(Item 10)
The control apparatus may further comprise a plan acquisition unit configured to acquire a production plan of the equipment. The adjusting unit may adjust the operation amount based on a predicted result and a production plan.

(Item 11)
A second aspect of the present invention provides a control method. The control method may include controlling a control target by a machine learned control model to output an operation amount of the control target according to a state of equipment having the control target provided therein. The control method may include predicting a future state of the equipment. The control method may include adjusting the operation amount based on a predicted result. The control method may include outputting an adjusted operation amount to the control target.

(Item 12)
A third aspect of the present invention provides a recording medium having a control program recorded thereon. The control program may be executed by a computer. The control program may cause the computer to function as a control unit, configured to control a control target by a machine learned control model to output an operation amount of the control target according to a state of equipment having the control target provided therein. The control program may cause the computer to function as a prediction unit, configured to predict a future state of the equipment. The control program may cause the computer to function as an adjusting unit, configured to adjust the operation amount based on a predicted result. The control program may cause the computer to function as an output unit, configured to output an adjusted operation amount to the control target.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to the claims. And all the combinations of the features described in the embodiment(s) are not necessarily essential to means provided by aspects of the invention.

Figure 1:
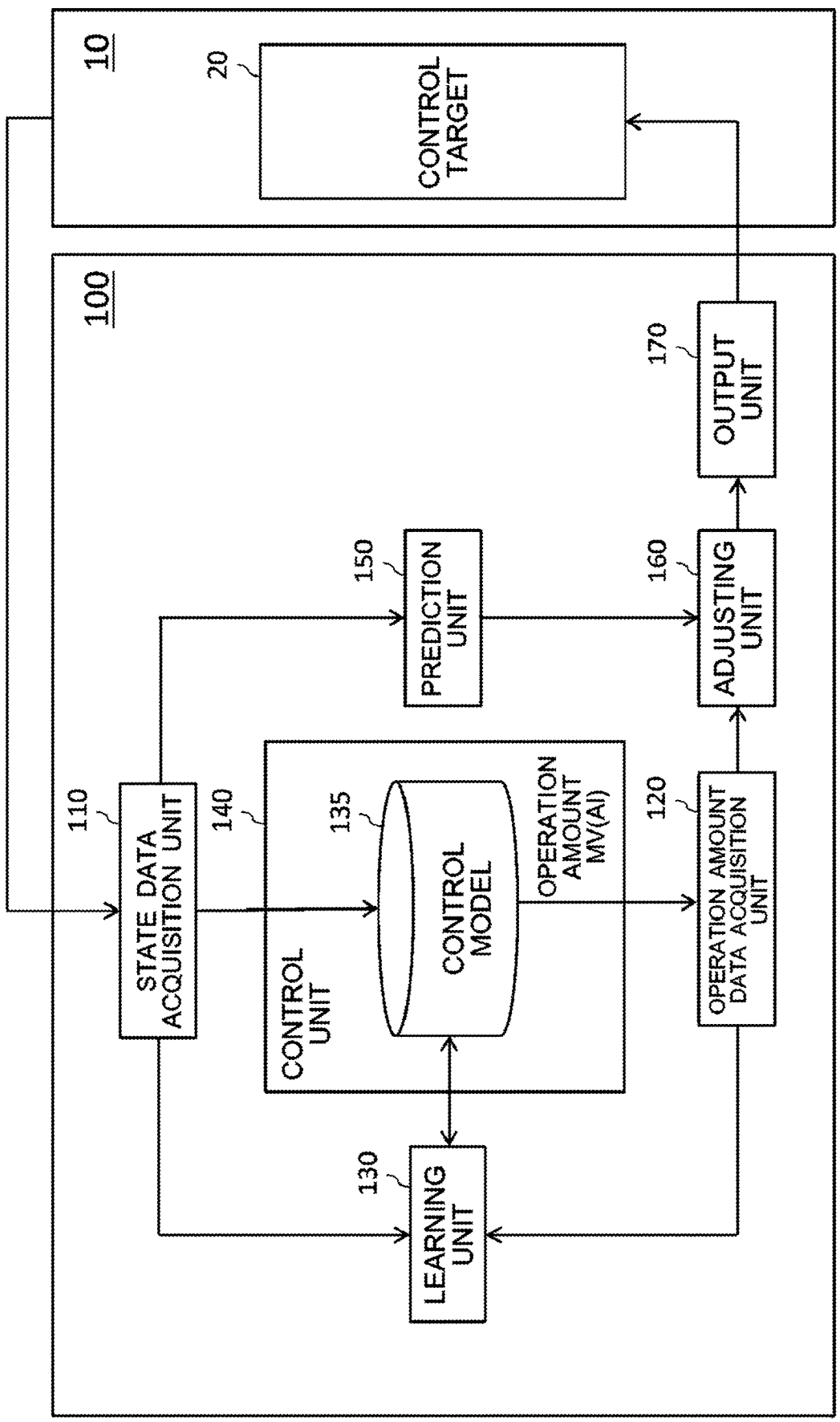
FIG. 1 illustrates one example of a block diagram of a control apparatus 100 according to the present embodiment together with equipment 10 having a control target 20 provided therein.

FIG. 1 illustrates one example of a block diagram of a control apparatus 100 according to the present embodiment together with equipment 10 having a control target 20 provided therein. In controlling the control target 20 using a learning model generated by machine learning (also referred to as AI (Artificial Intelligence) control), the control apparatus 100 according to the present embodiment predicts the future state of the equipment 10 having a control target 20 provided therein. Then the control apparatus 100 according to the present embodiment adjusts the operation amount output by the learning model based on the predicted result.

The equipment 10 is equipment, an apparatus or the like provided in the control target 20. For example, the equipment 10 may be a plant, or may be a composite apparatus that combines a plurality of devices. Examples of the plant include an industrial plant such as a chemical plant or a biological plant, as well as a plant for managing and controlling a wellhead or its surrounding area of a gas field, an oil field or the like, a plant for managing and controlling power generation such as hydraulic power generation, thermal power generation and nuclear power generation, a plant for managing and controlling energy harvesting such as solar photovoltaic generation, wind power generation or the like, and a plant for managing and controlling water and sewerage, a dam or the like.

The equipment 10 has a control target provided therein. In this figure, although one example when only one control target 20 is provided at the equipment 10 is illustrated, it is not limited thereto. The equipment 10 may have a plurality of control targets provided therein.

Also, one or more sensors (not illustrated) for measuring various states (physical quantities) inside and outside the equipment 10 may be provided at the equipment 10. Such a sensor measures, for example, drive data, consumption amount data and external environment data and so on.

Herein, the drive data indicates an operation state of a result of controlling the control target 20. For example, the drive data may indicate a measured value PV (Process Variable) measured for the control target 20, such as the output of the control target 20 (the controlling amount), or various values changed by the output of the control target 20, as one example.

The consumption amount data indicates at least one consumption amount of energy or raw material at the equipment 10. For example, the consumption amount data may indicate the consumption amount of power or fuel (LPG (Liquefied Petroleum Gas) as one example) as the energy consumption amount.

The external environment data indicates a physical quantity that may function as a disturbance to the control of the control target 20. For example, the external environment data may indicate various physical quantities that change along with the temperature, humidity, sunshine, wind direction, air flow rate, precipitation of the ambient air of the equipment 10, and the control of the other devices provided at the equipment 10, and so on.

The control target 20 may be a device and an apparatus and so on that becomes a target of the control. For example, the control target 20 may be an actuator such as a valve, a pump, a heater, a fan, a motor, a switch and so on for controlling at least one physical quantity of the pressure, temperature, pH, velocity or flow rate or the like in the process of the equipment 10, and is configured to input a given operation amount MV (Manipulated Variable) and output a controlling amount.

In performing AI control on the control target 20, the control apparatus 100 according to the present embodiment predicts the future state of the equipment 10 having a control target 20 provided therein. Then the control apparatus 100 according to the present embodiment adjusts the operation amount output by the learning model based on the predicted result.

The control apparatus 100 may be a computer such as a PC (personal computer), tablet computer, smart phone, workstation, server computer, or It can be a computer such as a general-purpose computer, or a computer system with a plurality of computers connected to it. Such a computer system is also the computer in a broad sense. The control apparatus 100 may also be implemented by a virtual computer environment that can be executed one or more times in the computer. Alternatively, the control apparatus 100 may be a dedicated computer designed for AI control, or may be a dedicated hardware realized by the dedicated circuitry. Also, when the control apparatus 100 is possible to be connected to the Internet, the control apparatus 100 may be realized by cloud computing.

The control apparatus 100 includes a state data acquisition unit 110, an operation amount data acquisition unit 120, a learning unit 130, a control model 135, a control unit 140, a prediction unit 150, an adjusting unit 160 and an output unit 170. Note that each of these blocks are functionally separated functional blocks, and may not necessarily be consistent with an actual device configuration. That is, even if one block is illustrated in this figure, the block does not necessarily have to consist of one device. Moreover, even if separate blocks are illustrated in this figure, the blocks do not necessarily have to consist of separate devices.

The state data acquisition unit 110 acquires state data indicating the state of the equipment 10 having the control target 20 provided therein. For example, the state data acquisition unit 110 acquires the state data such as the drive data, the consumption amount data, the external environment data and so on measured by the sensor provided at the equipment 10 from the sensor via the network. However, it is not limited to this. The state data acquisition unit 110 may acquire such state data from the operator, or may acquire such state data from various memory devices. The state data acquisition unit 110 supplies the learning unit 130, the control model 135 and the prediction unit 150 with the acquired state data.

The operation amount data acquisition unit 120 acquires the operation amount data indicating the operation amount of the control target 20. For example, the operation amount data acquisition unit 120 acquires, as the operation amount data, the data indicating the operation amount MV (AI) output by the control model 135 in AI control on the control target 20 from the control unit 140. However, it is not limited to this. The operation amount data acquisition unit 120 may acquire such operation amount data from the operator, or may acquire such operation amount data from various memory devices. The operation amount data acquisition unit 120 supplies the learning unit 130 and the adjusting unit 160 with the acquired operation amount data.

It should be noted that in this figure, the case where the operation amount data acquisition unit 120 acquires, as the operation amount data, the data indicating the operation amount MV (AI) output by the control model 135 is shown as one example. However, it is not limited to this. In the learning phase, when the control apparatus 100 performs machine learning of the data, as the learning data, under control of the control target 20 by the other controller (not illustrated), the operation amount data acquisition unit 120 may also acquire, as the operation amount data, the data indicating the operation amount given to the control target 20 from the other controller. As one example, when the control target 20 is switchable between a feedback control by the operation amount MV (FB: FeedBack) given from the other controller and an AI control by the operation amount MV (AI) given from the control model 135, the operation amount data acquisition unit 120 may also acquire, as the operation amount data, the data indicating the operation amount MV (FB) given to the control target 20 from the other controller in the learning phase. It should be noted that such a FB control may be a control using at least one of, for example, proportional control (P control), integrating control (I control), or differential control (D control), and may be a PID control as one example. Also, such another controller may be integrally constructed as a part of the control apparatus 100 according to the present embodiment, or may be constructed as a separate body independent from the control apparatus 100.

The learning unit 130 generates a control model 135 for outputting the operation amount according to the state of the equipment 10 using the state data and the operation amount data by machine learning. For example, the learning unit 130 generates a control model 135 for outputting the operation amount MV (AI) according to the state of the equipment 10 by reinforcement learning, taking the state data supplied from the state data acquisition unit 110 and the operation amount data indicating the operation amount MV (AI) supplied from the operation amount data acquisition unit 120 as learning data. That is, the learning unit 130 generates the control model 135 according to the input of the state data by reinforcement learning so that an operation amount with a higher reward value determined by a predetermined reward function is output as a recommended operation amount. The details are described below.

The control model 135 is a learning model generated by the learning unit 130 by machine learning, and is configured to output the operation amount MV (AI) according to the state of the equipment 10. For example, the control model 135 inputs the state data supplied from the state data acquisition unit 110 and outputs the operation amount MV (AI) recommended to be given to the control target 20 according to the state of the equipment 10. It should be noted that in this figure, the case where the control model 135 is housed in the control apparatus 100 is shown as one example, it is not limited to this. The control model 135 may also be stored in an apparatus different from the control apparatus 100 (for example, on a cloud server). Similarly, for the learning unit 130, an apparatus different from the control apparatus 100 may be included therein.

The control unit 140 controls the control target 20 according to the operation amount MV (AI) output by the control model 135. That is, the control unit 140 controls the control target 20 according to the machine learned control model 135 to output the operation amount of the control target 20 according to the state of the equipment 10 having the control target 20 provided therein. The control unit 140 supplies the operation amount data acquisition unit 120 with the operation amount MV (AI) output by the control model 135.

The prediction unit 150 predicts the future state of the equipment 10. The prediction unit 150 predicts the future state of the equipment 10 based on the state data supplied from the state data acquisition unit 110. It should be noted that herein, "predicting" includes the prediction unit 150, as a subject, predicting a future state of the equipment 10, in addition, the prediction unit 150 causing the other apparatus to predict the future state of the equipment 10, and acquiring, from the other apparatus, the future state of the equipment 10 predicted by the other apparatus. The prediction unit 150 supplies the adjusting unit 160 with the predicted result of the future state of the equipment 10.

The adjusting unit 160 supplies the output unit 170 with the operation amount MV (AI) supplied from the operation amount data acquisition unit 120 in the learning phase. On the other hand, in the operating phase, the adjusting unit 160 adjusts the operation amount MV (AI) based on the predicted result supplied from the prediction unit 150 according to the needs. Then, the adjusting unit 160 supplies the output unit 170 with the adjusted operation amount MV (AI)_adj.

The output unit 170 outputs the operation amount MV supplied from the adjusting unit 160 to the control target 20. That is, in the learning phase, the output unit 170 outputs the operation amount MV (AI) as it is output by the control model 135 to the control target 20. On the other hand, in the operating phase, the output unit 170 outputs the operation amount MV (AI) as it is output by the control model 135 or the operation amount MV (AI)_adj adjusted by the adjusting unit 160 to the control target 20. This will be described in detail using a flow.

Figure 2:
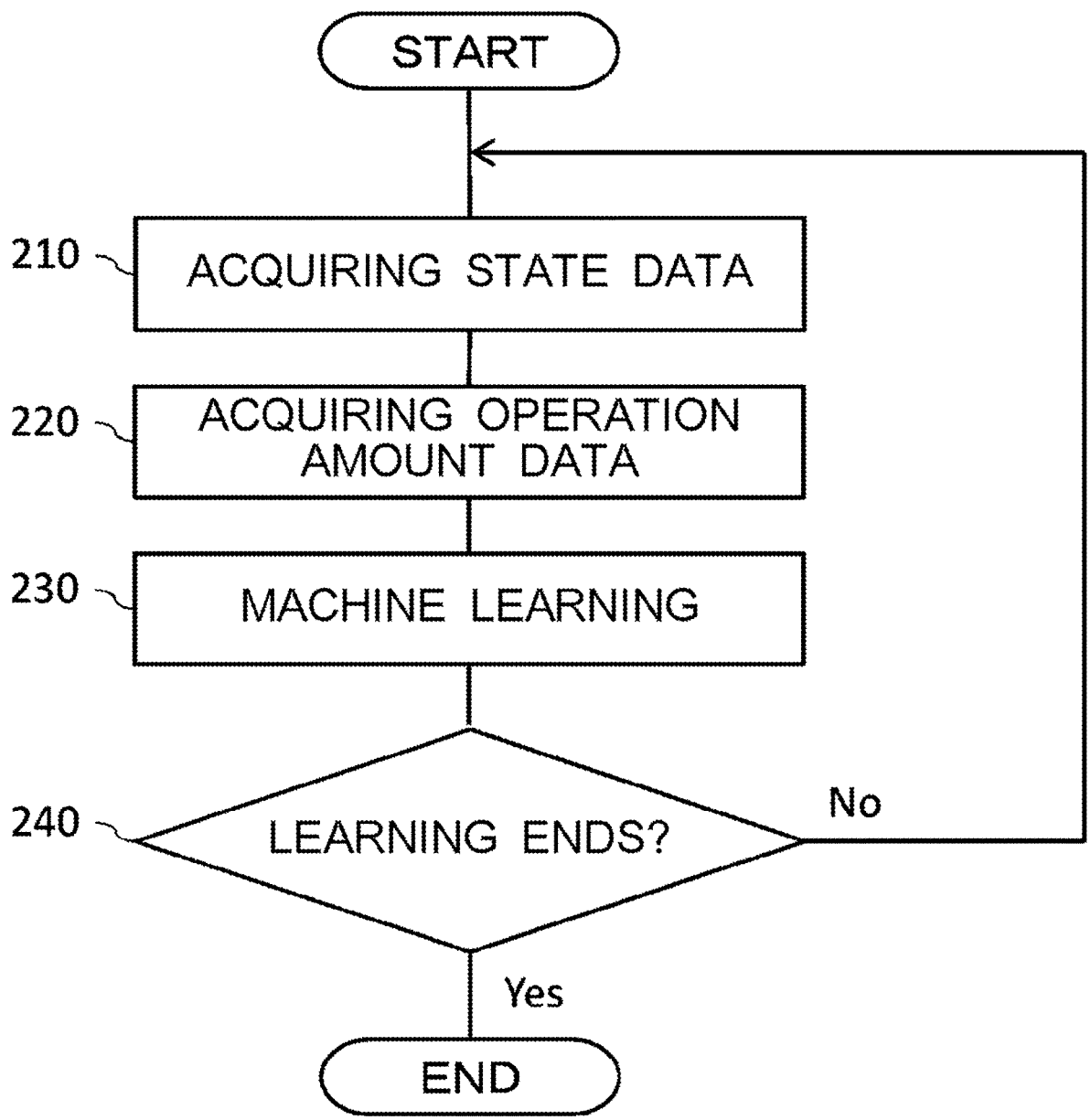
FIG. 2 illustrates one example of a flow for the control apparatus 100 according to the present embodiment producing a control model 135 by machine learning.

FIG. 2 illustrates one example of a flow for the control apparatus 100 according to the present embodiment generating the control model 135 by machine learning. In the learning phase, the control apparatus 100 generates, by machine learning, the control model 135 for outputting the operation amount according to the state of the equipment 10 using the state data and the operation amount data.

In step 210, the control apparatus 100 acquires the state data. For example, the state data acquisition unit 110 acquires the state data indicating the state of the equipment 10 having the control target 20 provided therein. As one example, the state data acquisition unit 110 acquires, as the state data, the drive data, consumption amount data and the external environment data and so on measured by the sensor provided at the equipment 10 from the sensor via the network. The state data acquisition unit 110 supplies the learning unit 130 and the control model 135 with the acquired state data.

In step 220, the control apparatus 100 acquires the operation amount data. For example, the operation amount data acquisition unit 120 acquires the operation amount data indicating the operation amount of the control target 20. As one example, the operation amount data acquisition unit 120 acquires, as the operation amount data, the data indicating the operation amount MV (AI) output by the control model 135 in AI control on the control target 20 from the control unit 140. The operation amount data acquisition unit 120 supplies the learning unit 130 and the adjusting unit 160 with the acquired operation amount data. Accordingly, the adjusting unit 160 supplies the output unit 170 with the operation amount MV (AI) supplied from the operation amount data acquisition unit 120. Then, the output unit 170 outputs the operation amount supplied from the adjusting unit 160 to the control target 20. That is, in the learning phase, the output unit 170 outputs the operation amount MV (AI) as it is output by the control model 135 to the control target 20. It should be noted that although in this figure, the case where the control apparatus 100 acquires the operation amount data after acquiring the state data is shown as one example, it is not limited to this. The control apparatus 100 may acquire the state data after acquiring the operation amount data, or may acquire the state data and the operation amount data simultaneously.

In step 230, the control apparatus 100 generates the control model 135. For example, the learning unit 130 generates a control model 135 for outputting the operation amount according to the state of the equipment 10 using the state data and the operation amount data by machine learning. As one example, the learning unit 130 generates the control model 135 for outputting the operation amount MV (AI) according to the state of the equipment 10 by reinforcement learning taking the state data acquired in step 210 and the operation amount data indicating the operation amount MV (AI) acquired in step 220 as the learning data.

Generally, if an agent observes the state of the environment and chooses an activity, the environment changes based on the activity. In reinforcement learning, the agent learns choosing (decision making) a better activity by being given some reward in response to such a change of the environment. In contrast to supervised learning where a completely correct answer is given, in reinforcement learning, a reward is given as a fragmented value based on the change of a part of the environment. Therefore, the agent learns to choose an activity so that the total reward throughout the future is to be a maximum value. In this way, in reinforcement learning, the agent learns an appropriate activity in light of the interaction given to the environment by the activity by learning the activity, that is, learns the activity for making the obtainable reward in the future a maximum value.

In the present embodiment, the reward in such reinforcement learning may be an indicator for evaluating the operation of the equipment 10, or may be a value determined by a predetermined reward function. Herein, a "function" is a map with a rule that maps each element of one set to each element of another set on a one-to-one basis, or may be, for example, an expression or a table.

The reward function outputs an evaluated value of the state of the equipment 10 (reward value) indicated by the state data according to the input of the state data. As mentioned above, for example, the state data includes the measured value PV measured for the control target 20. Accordingly, the reward function may be defined as a function such that the closer the measured value PV is to the target value SV (Setting Variable), the higher the reward value is. Herein, a function whose variable is the absolute value of the difference between the measured value PV and the target value SV shall be defined as the evaluation function. That is, as one example, when the control target 20 is a valve, the evaluation function may be a function whose variable is the absolute value of the difference between the measured value PV that is the opening of the valve actually measured by the sensor, and the target value SV that is the opening of the target valve. Then, the reward function may be a function whose variable is a value of the evaluation function obtained by such an evaluation function.

Also, as mentioned above, the state data also includes, for example, various values that change according to the output of the control target 20, consumption amount data, external environment data and so on in addition to the measured value PV. Accordingly, the reward function may be a function that increases or decreases the reward value based on such various values, consumption amount data, external environment data and so on. As one example, when a constraint that must be followed for such various values and the consumption amount data is provided, the reward function may be a function that makes the reward value to be a minimal value with reference to the external environment data when the constraint condition is not satisfied by such various values and the consumption amount data. Also, when a goal to aim for various values and the consumption amount data is provided, the reward function may be a function that, with reference to the external environment data, increases the reward value as such various values and the consumption amount data are closer to the goal and decreases the reward value as such various values and the consumption amount data are further from the goal.

The learning unit 130 acquires the reward value in each learning data based on such a reward function. Then, the learning unit 130 performs reinforcement learning using each pair of the learning data and the reward value. In this case, the learning unit 130 may perform the learning process by a known technique such as the steepest descent method, neural network, the DQN (Deep Q-Network), the Gaussian Process and deep learning. Then the learning unit 130 learns so that the operation amount with the higher reward value is preferentially output as the recommended operation amount. That is, the learning unit 130 generates the control model 135 according to the input of the state data by reinforcement learning so that an operation amount with a higher reward value determined by a predetermined reward function is output as a recommended operation amount. In this way, the model is updated, and the control model 135 is generated.

In step 240, the control apparatus 100 determines to end the machine learning or not. In step 240, when it is determined not to end the learning (the case of "No"), the control apparatus 100 returns the process to step 210 and continues the flow. On the other hand, in step 240, when it is determined to end the learning (the case of "Yes"), the control apparatus 100 ends the flow.

Figure 3:
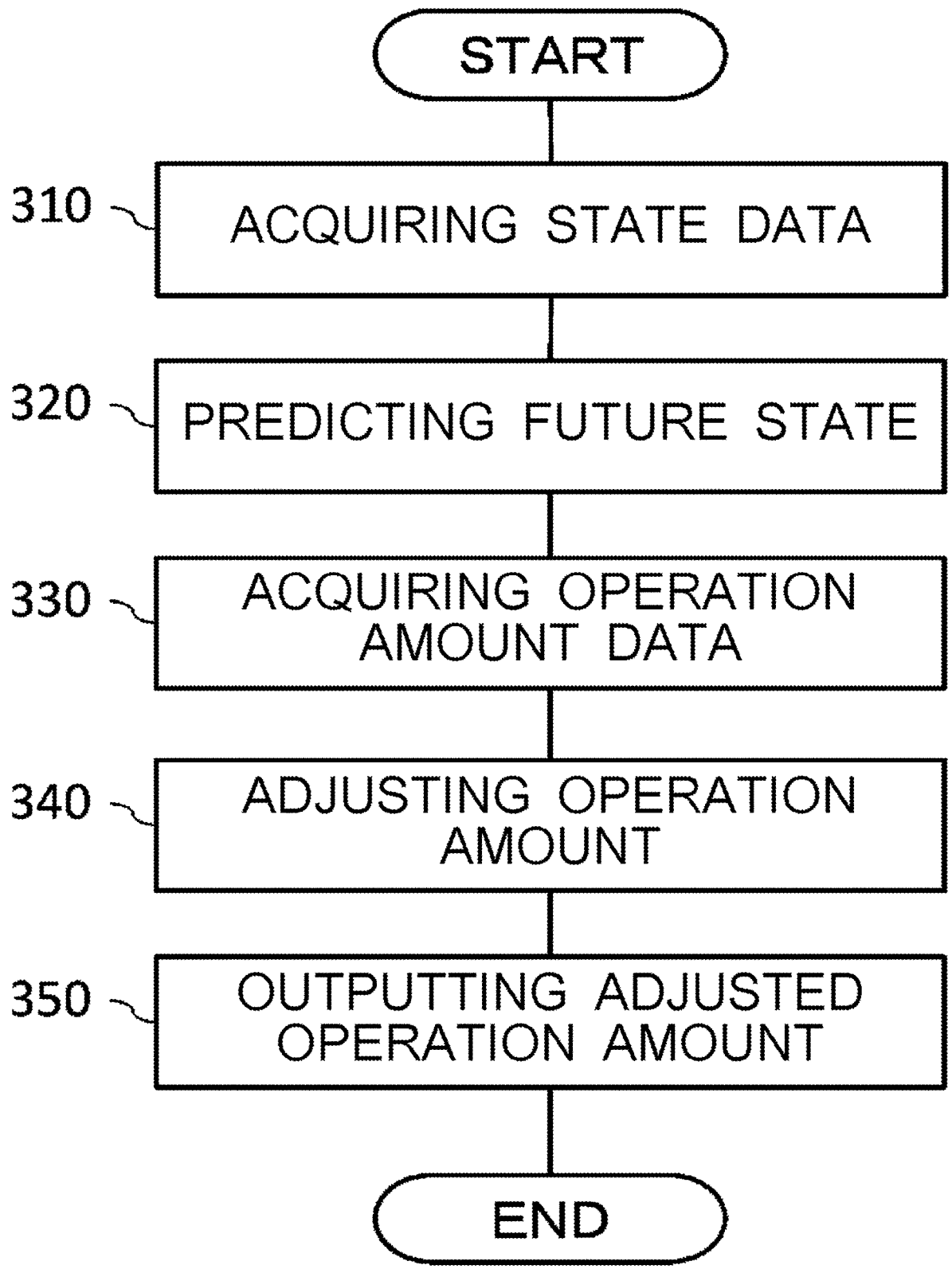
FIG. 3 illustrates one example of a flow for the control apparatus 100 according to the present embodiment adjusting an operation amount.

FIG. 3 illustrates one example of a flow of the control apparatus 100 according to the present embodiment adjusting the operation amount. In the operating phase, in performing AI control on the control target 20 by the control model 135 generated by the machine learning in the learning phase, the control apparatus 100 predicts the future state of the equipment 10 having the control target 20 provided therein. Then the control apparatus 100 adjusts the operation amount that the control model 135 outputs, based on the predicted result.

In step 310, the control apparatus 100 acquires the state data. For example, the state data acquisition unit 110 acquires the state data indicating the state of the equipment 10 having the control target 20 provided therein. As one example, the state data acquisition unit 110 acquires the drive data, consumption amount data and the external environment data and so on measured by the sensor provided at the equipment 10 from the sensor via the network, as the state data. The state data acquisition unit 110 supplies the control model 135 and the prediction unit 150 with the acquired state data.

In step 320, the control apparatus 100 predicts the future state. For example, the prediction unit 150 predicts the future state of the equipment 10 based on the state data supplied from the state data acquisition unit 110 in step 310.

As one example, the upper plumbing of an atmospheric pressure distillation tower used in oil refining is destined to develop corrosion and wall thinning on the inside. In such a case, the prediction unit 150 may have a prediction model indicating the relationship between the state of the process and the wall thinning progression. It should be noted that such a prediction model, for example, can be generated by performing supervised learning using the process data measured at a plurality of locations and the measured result of the thickness in a periodic manner related to the upper plumbing of the atmospheric pressure distillation tower. Then the prediction unit 150 can construct a regression formula and predict the wall thinning of the plumbing in the future. Also, the prediction unit 150 can predict the time until reaching the minimal thickness that can maintain the health of the plumbing (remaining life) from the wall thinning (wall thinning velocity) per unit time. Also, the prediction unit 150 can calculate the cost for adding the suppressant for suppressing the corrosion of the plumbing based on at least one of the wall thinning or the remaining life of the plumbing in the future. Also, the prediction unit 150 can calculate the maintenance frequency based on at least one of the wall thinning or the remaining life of the plumbing in the future.

In this way, the prediction unit 150 may predict the future state of health of the equipment 10. Such a state of health may include a remaining thickness of the plumbing at the equipment 10. Also, the prediction unit 150 may predict the future maintenance cost at the equipment 10 by calculating the maintenance cost in the future from the future state of health of the equipment 10. Such a maintenance cost may include the cost according to adding the suppressant for suppressing the deterioration of the equipment 10. The prediction unit 150 supplies the adjusting unit 160 with the predicted result predicted in this way.

In step 330, the control apparatus 100 acquires the operation amount data. For example, the operation amount data acquisition unit 120 acquires the operation amount data indicating the operation amount of the control target 20. As one example, in performing AI control on the control target 20, the operation amount data acquisition unit 120 acquires the data indicating the operation amount MV (AI) output by the control model 135 from the control unit 140, as the operation amount data. The operation amount data acquisition unit 120 supplies the adjusting unit 160 with the acquired operation amount data.

In step 340, the control apparatus 100 adjusts the operation amount MV (AI). For example, the adjusting unit 160 adjusts the operation amount MV (AI) supplied from the operation amount data acquisition unit 120 in step 330, based on the predicted result supplied from the prediction unit 150 in step 320.

As one example, suppose that the adjusting unit 160 has acquired the future state of health of the equipment 10 from the prediction unit 150, as the predicted result. In this case, the adjusting unit 160 identifies the operating condition that degrade the future state of health of the equipment 10 from the relationship between the operation amount MV (AI) and the future state of health.

As an example, suppose that the predicted results of progressive wall thinning of the plumbing in the future have been obtained for an operation amount MV (AI) under which the temperature of the fluid flowing through the plumbing exceeds a threshold value. Also, suppose that the predicted result that the wall thinning of the plumbing is suppressed in the future has been obtained for the operation amount MV (AI) that causes the temperature of the fluid flowing through the plumbing to be below the threshold value. In such a case, the adjusting unit 160 can identify that the main factor causing wall thinning is that the temperature of the fluid flowing through the plumbing is equal to or above a threshold value. It should be noted that this can happen, in a case, for example, where a substance that causes progress of corrosion is produced, if the temperature of the fluid is equal to or above a threshold value, for example, when a substance that causes corrosion to progress is produced. In such a case, the adjusting unit 160 adjusts the operation amount MV (AI) so that the temperature of the fluid does not become equal to or exceed the threshold value to MV(AI)_adj.

Similarly, suppose that the predicted result of a shortened remaining life is obtained for an operation amount MV (AI) such that the velocity of the fluid flowing through the plumbing becomes equal to or exceeds a threshold value. Also, suppose that the predicted result of longer remaining life is obtained for an operation amount MV (AI) such that the velocity of the fluid flowing through the plumbing is less than a threshold value. In such a case, the adjusting unit 160 can identify that the main factor that shortens the remaining life is that the velocity of the fluid flowing through the plumbing becomes equal to or exceeds a threshold value. It should be noted that this can happen when the fluid velocity becomes equal to or exceeds a threshold value, where the effects of flow-accelerated corrosion (FAC) and the liquid droplet impingement erosion (LDI) become more pronounced. In such a case, the adjusting unit 160 adjusts the operation amount MV(AI) so that the velocity of the fluid does not become equal to or exceed the threshold value to MV(AI)_adj. The adjusting unit 160 may, for example, in this way adjust the operation amount MV(AI)) according to the future state of health of the equipment 10.

Also, suppose that the adjusting unit 160 has acquired, as the predicted result, the future maintenance cost of the equipment 10 from the prediction unit 150. In this case, the adjusting unit 160 identifies the operating condition that increases the future maintenance cost of the equipment 10 from the relationship between the operation amount MV (AI) and the future maintenance cost.

As an example, suppose that the predicted results of increasing the cost for adding the corrosion inhibitor in the future has been obtained for an operation amount MV (AI) under which the temperature of the fluid flowing through the plumbing becomes equal to or exceeds a threshold value. Also, suppose that the predicted results of decreasing the cost for adding the corrosion inhibitor in the future have been obtained for an operation amount MV (AI) under which the temperature of the fluid flowing through the plumbing is less than a threshold value. In such a case, the adjusting unit 160 can identify that the factor causing the cost for adding the corrosion inhibitor increasing is that the temperature of the fluid flowing through the plumbing is equal to or above a threshold value. In such a case, the adjusting unit 160 adjusts the operation amount MV(AI) so that the temperature of the fluid does not become equal to or exceed the threshold value to MV(AI)_adj.

Similarly, suppose that the predicted results of increasing the maintenance frequency in the future (predicted results that may increase the maintenance cost) have been obtained for an operation amount MV (AI) under which the velocity of the fluid flowing through the plumbing becomes equal to or exceeds a threshold value. Also, suppose that the predicted results of decreasing the maintenance frequency in the future (predicted results that may decrease the maintenance cost) have been obtained for an operation amount MV (AI) under which the velocity of the fluid flowing through the plumbing is less than a threshold value. In such a case, the adjusting unit 160 can identify that the factor that increases the maintenance cost is that the velocity of the fluid flowing through the plumbing exceeds a threshold value. In such a case, the adjusting unit 160 adjusts the operation amount MV (AI) so that the velocity of the fluid does not become equal to or exceed the threshold value to MV(AI)_adj. The adjusting unit 160 may, for example, in this way adjust the operation amount MV(AI)) according to the future maintenance cost of the equipment 10. The adjusting unit 160 supplies the output unit 170 with the adjusted operation amount MV (AI)_adj.

In step 350, the control apparatus 100 outputs the adjusted operation amount MV (AI)_adj. For example, in step 340, the output unit 170 outputs the operation amount MV (AI)_adj adjusted by the adjusting unit 160 to the control target 20. In this way, the control apparatus 100 controls the control target 20 with the operation amount MV (AI) adjusted based on the predicted result.

Generally, machine learning uses the input data to determine the parameters of the learning model, which are obtained probabilistically and are not theoretically guaranteed. Therefore, an abnormal inference data can be output from the learning model. Therefore, in performing AI control on the control target 20, the control apparatus 100 according to the present embodiment predicts the future state of the equipment 10 having the control target 20 provided therein. Then the control apparatus 100 adjusts the operation amount output by the control model 135 based on the predicted result. In this way, when it is predicted that the AI control may have a negative impact on the future state of the equipment 10, the control apparatus 100 according to the present embodiment can adjust the operation amount MV (AI) of the AI control and can control the control target 20 by the adjusted operation amount MV (AI)_adj. Herein, it is also considered that the control model 135 is machine learned to output the recommended operation amount MV (AI), taking into account the future predicted results at the equipment 10 (for example, by including them in the reward function) at the time when the control model 135 is generated by machine learning. However, the control apparatus 100 according to the present embodiment does not incorporate the adjustment that takes into account the future predicted results of the equipment 10 into the machine learning for generating the control model 135, but adjusts the operation amount MV (AI) output by the control model 135 after the fact. This makes it possible to simplify the machine learning for generating the control model 135 with the control apparatus 100 according to the present embodiment. In addition, the output of the control model 135 can be adjusted even for the control model 135 that has already been constructed. Also, with the control apparatus 100 according to the present embodiment, it is possible to visualize how the operation amount MV (AI) is adjusted without making it a black box in machine learning.

Also, the control apparatus 100 according to the present embodiment predicts the future health (for example, remaining wall thickness of the plumbing) at the equipment 10 and adjusts the operation amount according to the state of health. This allows the control apparatus 100 according to the present embodiment to control the control target 20 to avoid, for example, operating conditions in which corrosion tends to progress, thereby suppressing degradation of the state of health at the equipment 10.

Also, the control apparatus 100 according to the present embodiment predicts the future maintenance cost (for example, cost for adding the suppressant) at the equipment 10 and adjusts the operation amount according to the state of maintenance cost. This allows the control apparatus 100 according to the present embodiment to control the control target 20 to avoid, for example, operating conditions in which the cost for adding the suppressant tends to increase, thereby suppressing increasing of the maintenance cost at the equipment 10.

Figure 4:
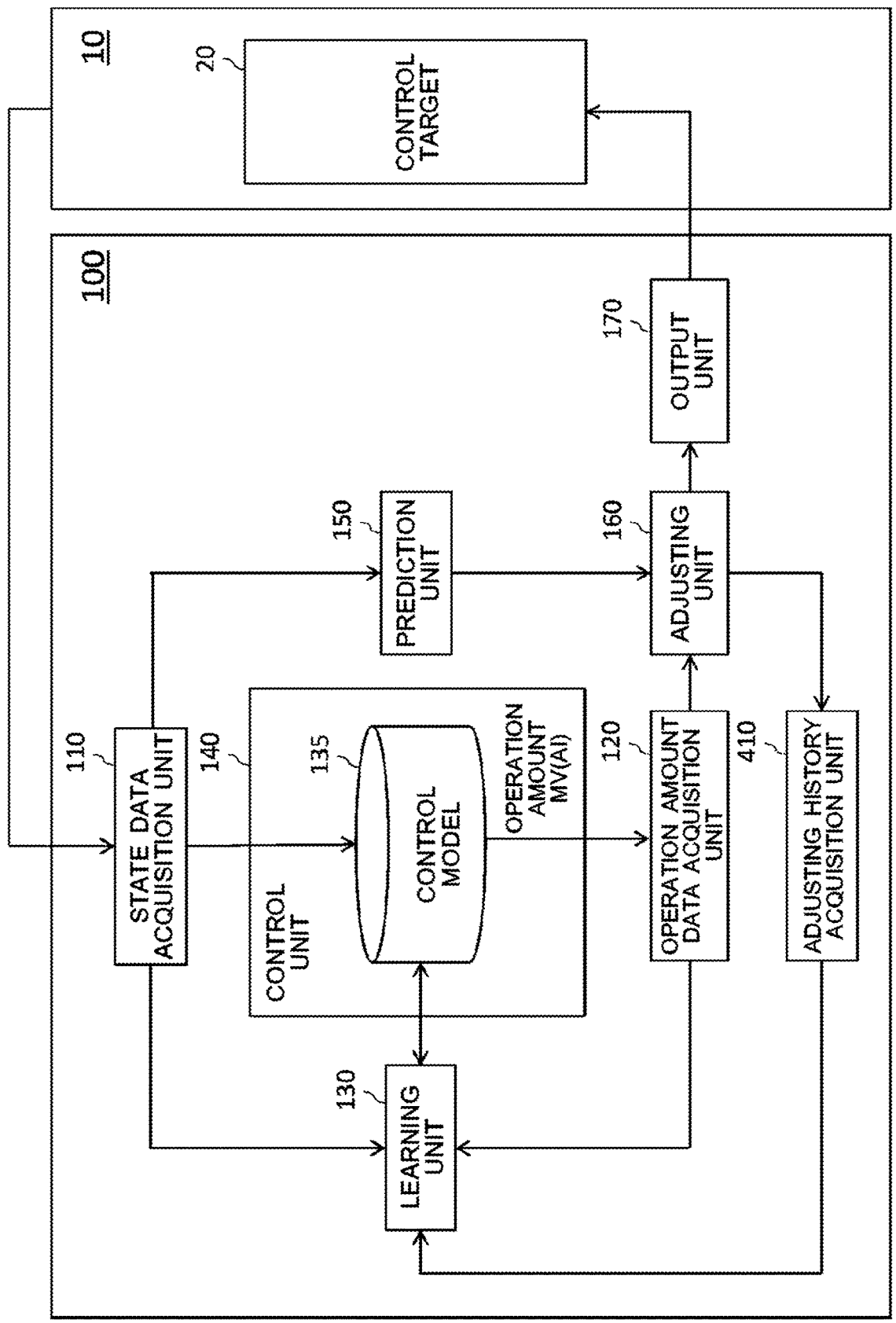
FIG. 4 illustrates one example of a block diagram of the control apparatus 100 according to a first modification example of the present embodiment together with the equipment 10 having a control target 20 provided therein.

FIG. 4 illustrates one example of a block diagram of the control apparatus 100 according to a first modification example of the present embodiment together with the equipment 10 having a control target 20 provided therein. In FIG. 4, members having the same function and configuration as those in FIG. 1 are given the same reference numerals, and the following describes only differing points. In the control apparatus 100 according to the first modification example, the constraint condition is learned in machine learning based on the history adjusted by the operation amount MV (AI). The control apparatus 100 according to the first modification example further comprises an adjusting history acquisition unit 410.

The adjusting history acquisition unit 410 acquires the adjusting history of the operation amount MV (AI) from the adjusting unit 160. For example, the adjusting history acquisition unit 410 acquires, as the adjusting history of the operation amount MV (AI), the information indicating the operation amount MV (AI) output by the control model 135 and the operation amount MV (AI)_adj adjusted by the adjusting unit 160. Then the adjusting history acquisition unit 410 supplies the learning unit 130 with the acquired adjusting history. Accordingly, the learning unit 130 further learns the constraint condition in machine learning based on the history adjusted by the operation amount.

As one example, when the operation amount MV (AI)=113 is adjusted to the operation amount MV (AI)_adj=100, the learning unit 130 learns the constraint condition to prohibit the operation amount MV (AI)=113 before adjustment from being output from the control model 135. Similarly, when the operation amount MV (AI)=47 is adjusted to operation amount MV (AI)_adj=50, the learning unit 130 learns the constraint condition to prohibit the operation amount MV (AI)=47 before adjustment from being output from the control model 135. In this way, when the operation amount MV (AI) is adjusted to the operation amount MV (AI)_adj by the adjusting unit 160, the learning unit 130 learns the operation amount MV (AI) for prohibiting the output from the control model 135 as a constraint condition. Also, by accumulating the prohibited values of the operation amount MV (AI) in this way, the learning unit 130 learns the constraint condition that the upper limit value of the operation amount MV(AI) is 100 and the lower limit value is 50. In this way, the constraint conditions that the learning unit 130 learns may include at least one of the upper or lower limit values of the operation amount MV (AI) that are allowed to be output from the control model 135. Then, the learning unit 130 re-generates the control model 135 that outputs the operation amount according to the state of the equipment 10 using the state data and operation amount data by relearning in the learning phase under the constraint conditions learned in this way.

In this way, the control apparatus 100 according to the first modification example learns the constraint condition in machine learning based on the history adjusted by the operation amount MV (AI). In this way, with the control apparatus 100 according to the first modification example, for example, since the operating conditions or the like conducive to progressive wall thinning can be fed back to the learning unit 130, the control model 135 can be re-generated so that in the future the control model 135 outputs an operation amount NV (AI) that is less likely to result in progressive wall thinning.

Figure 5:
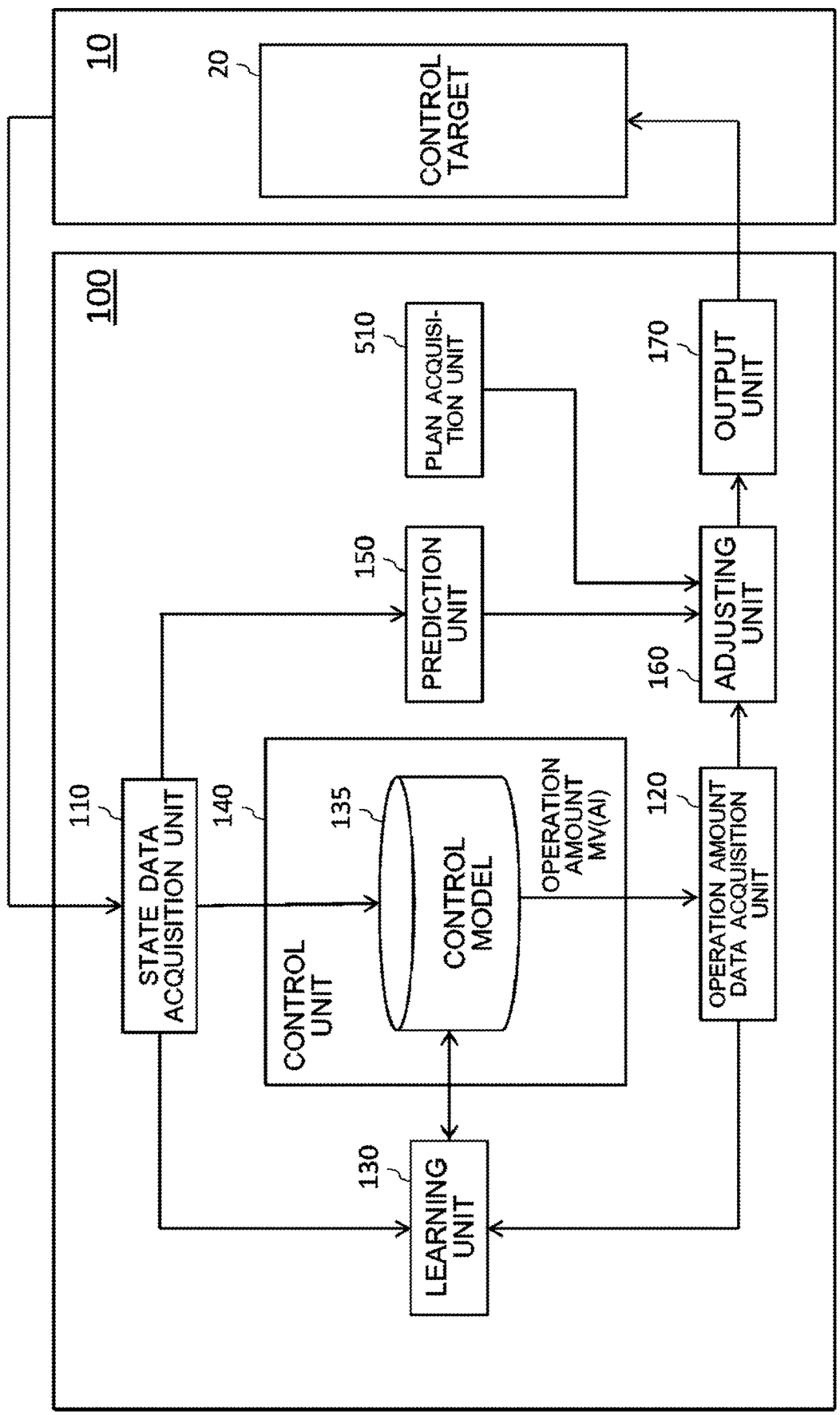
FIG. 5 illustrates one example of a block diagram of the control apparatus 100 according to a second modification example of the present embodiment together with the equipment 10 having a control target 20 provided therein.

FIG. 5 illustrates one example of a block diagram of the control apparatus 100 according to a second modification example of the present embodiment together with the equipment 10 having a control target 20 provided therein. In FIG. 5, members having the same function and configuration as those in FIG. 1 are given the same reference numerals, and the following describes only differing points. In the control apparatus 100 according to the second modification example, in adjusting the operation amount MV (AI), a production plan at the equipment 10 is taken in to account. The control apparatus 100 according to the second modification example further comprises a plan acquisition unit 510 configured to acquire the production plan at the equipment 10.

The plan acquisition unit 510 acquires the production plan at the equipment 10. For example, the plan acquisition unit 510 acquires the information indicating the types of the product to be produced, the production amount and the production period at the equipment 10 via the network. However, it is not limited to this. The plan acquisition unit 510 may acquire such a production plan from the operator, or may acquire from various memory devices or the like. The plan acquisition unit 510 supplies the adjusting unit 160 with the acquired production plan.

The adjusting unit 160 adjusts the operation amount MV (AI) based on the predicted result supplied from the prediction unit 150 and the production plan supplied from the plan acquisition unit 510. For example, suppose that the adjusting unit 160 has determined to adjust the operation amount MV (AI) to the operation amount MV (AI)_adj based on the predicted result. In this case, the adjusting unit 160 considers the effect on productivity of changing the operation amount. As one example, suppose that the adjusting unit 160 has determined to adjust the operation amount MV (AI)=113 to the operation amount MV (AI)_adj=100. In this case, the adjusting unit 160 estimates the production amount per unit time when the operation amount MV (AI)=113 has been changed to the operation amount MV (AI)_adj=100. As a result, it is estimated that in the control by the operation amount MV (AI)_adj after adjustment, the designated production amount in the designated production period of the designated product cannot be produced according to the acquired production plan. On the other hand, in a case of changing to the operation amount MV (AI)_adj=105, it is estimated that the designated production amount in the designated production period of the designated product can be produced. In this case, the adjusting unit 160 readjusts the operation amount MV (AI)_adj=100 to a value between the operation amount MV (AI) and the operation amount MV (AI)_adj, for example, to the operation amount MV (AI)_adj'=105. That is, the adjusting unit 160 adjusts the operation amount MV (AI) based on the predicted result in a range satisfying the production plan. Then the adjusting unit 160 supplies the output unit 170 with the adjusted operation amount MV (AI)_adj'. Accordingly, the output unit 170 outputs the operation amount MV (AI)_adj' adjusted by the adjusting unit 160 to the control target 20. In this way, the control apparatus 100 controls the control target 20 with the operation amount MV (AI)_adj' adjusted based on the predicted result and the production plan.

Figure 6:
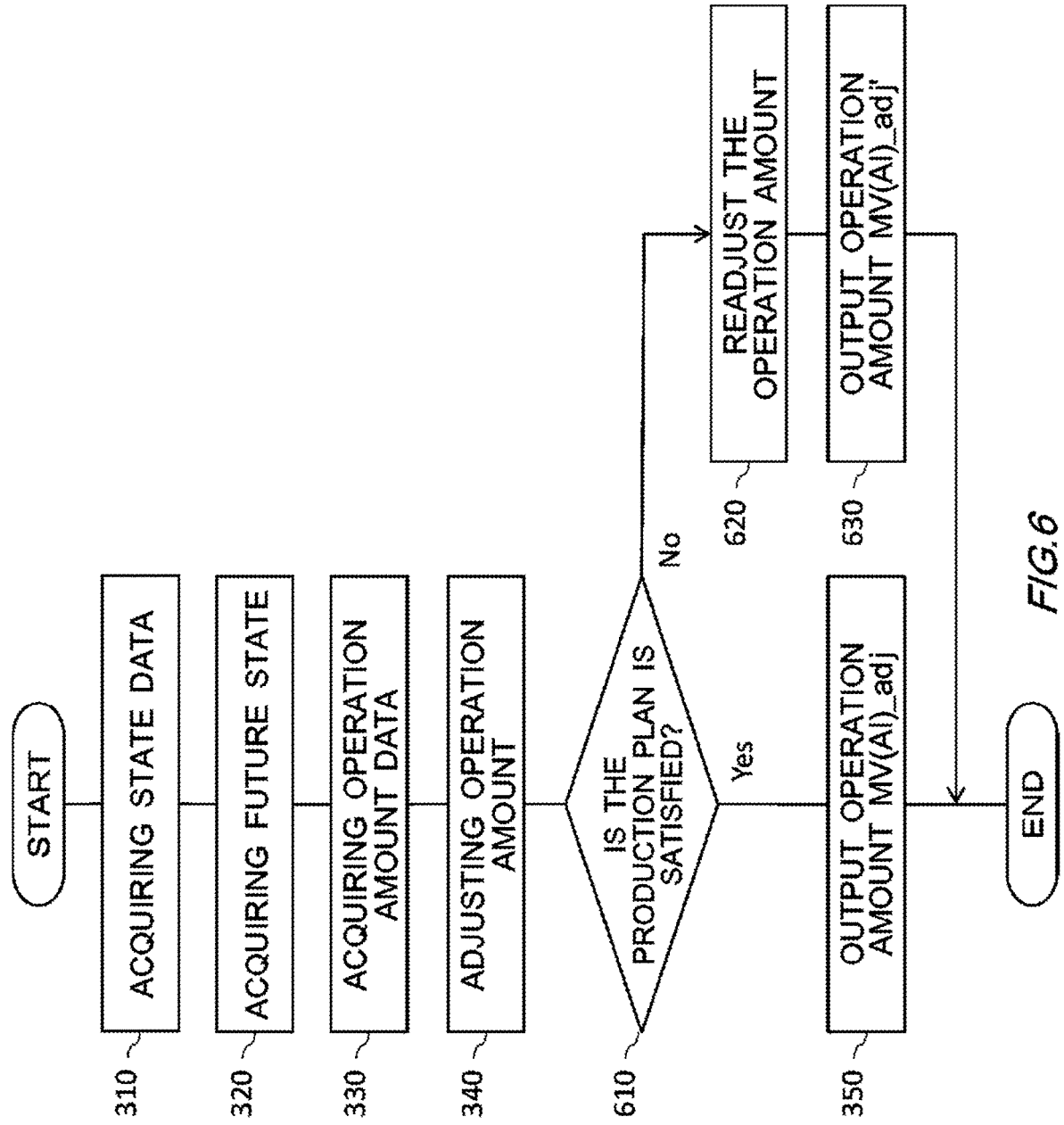
FIG. 6 illustrates one example of a flow for the control apparatus 100 according to the second modification example of the present embodiment adjusting the controlling amount.

FIG. 6 illustrates one example of a flow for the control apparatus 100 according to the second modification example of the present embodiment adjusting the controlling amount. In FIG. 6, the same processes as those in FIG. 3 are given the same reference numerals, and the following describes only differing points. The present flow further comprises step 610 to step 630.

In step 610, the control apparatus 100 determines whether the production plan is satisfied. For example, the adjusting unit 160 estimates the production amount per unit time when an operation amount MV (AI)_adj adjusted in step 340 is applied to the control target 20. In this case, the adjusting unit 160, as one example, may estimate the production amount per unit time using a known relative equation indicating the relationship between the target operation amount MV and the production amount per unit time. Then the adjusting unit 160 calculates the period of time from the current timing to the production period designated by the production plan for each product designated by the production plan. Then the adjusting unit 160 predicts the producible production amount until the production period by multiplying the estimated production amount per unit time by the period of time until the production period. When the predicted production amount is equal to or greater than the production amount designated by the production plan, the adjusting unit 160 determines that the production plan is satisfied (Yes). In step 610, when it is determined that the production plan is satisfied, the control apparatus 100 advances the process to step 350. That is, the control apparatus 100 controls the control target 20 by the operation amount MV (AI)_adj by outputting the operation amount MV (AI)_adj to the control target 20.

On the other hand, when the predicted production amount is below the production amount designated by the production plan, the adjusting unit 160 determines that the production plan is not satisfied (No). In step 610, when it is determined that the production plan is not satisfied, the adjusting unit 160 advances the process to step 620.

In step 620, the control apparatus 100 readjusts the operation amount MV (AI). For example, the adjusting unit 160 finds the operation amount MV (AI)_adj' that satisfies the production plan by trial and error within and between the operation amount MV (AI) and the operation amount MV (AI)_adj. Then the adjusting unit 160 readjusts the operation amount MV (AI)_adj to the found operation amount MV (AI)_adj'. The adjusting unit 160 supplies the output unit 170 with the readjusted operation amount MV (AI)_adj'.

In step 630, the control apparatus 100 outputs the operation amount MV (AI)_adj'. For example, the output unit 170 outputs the operation amount MV (AI)_adj' readjusted by the adjusting unit 160 to the control target 20 in step 630. In this way, the control apparatus 100 controls the control target 20 by the operation amount MV (AI)_adj' adjusted based on the predicted result and the production plan.

The above flow is to be described as one example in detail, for example, in the case where the target operation amount MV is the temperature at a specific point of the equipment 10 and the target production amount is the amount of electricity to be produced at the equipment 10 in a day. For example, the plan acquisition unit 510 acquires, as a production plan, the amount of electricity to be produced per day at the equipment 10 for the summer and winter seasons, and for the spring and autumn seasons, respectively. Herein, the amount of electricity to be produced per day varies depending on the balance of supply and demand, for example, the amount of electricity to be produced per day is 1000 Wh/day in the summer and winter seasons, and 700 Wh/day in the spring and autumn seasons. Suppose that the adjusting unit 160 then determines to adjust the temperature that is the target operation amount MV from 113° C. to 100° C.

In this case, suppose that the adjusting unit 160 estimates that the producible amount per hour of electricity becomes 38 Wh/hour when the temperature is changed to 100° C. using the known relative equation. Suppose that the adjusting unit 160 then predicts that the producible amount per hour of electricity becomes 912 Wh/day (=38 Wh/day×24 hours) by multiplying the producible amount per day of electricity by the hours per day, that is, 24. Herein, in the spring and autumn seasons, the amount of electricity to be produced per day is 700 Wh/day, and the predicted production amount (912 Wh/day) is equal to or greater than the production plan (700 Wh/day) designated by the production plan. In this case, the adjusting unit 160 determines that the production plan is satisfied, and adjusts the temperature that is the target operation amount MV from 113° C. to 100° C. Accordingly, the control apparatus 100 outputs 100° C. that is the temperature after adjustment to the control target 20.

On the other hand, in the summer and winter seasons, the amount of electricity to be produced is 1000 Wh/day, and the predicted production amount (912 Wh/day) is less than the production plan (1000 Wh/day) designated by the production plan. In this case, it is determined that the adjusting unit 160 does not satisfy the production plan. The adjusting unit 160 then estimates that the producible amount per hour of electricity becomes 42 Wh/hour when the temperature is changed to 105° C. by trial and error using the known relative equation. Then the adjusting unit 160 predicts that the producible amount per day of electricity becomes 1008 Wh/day (=42 Wh/hour×24 hours). In this way, the predicted production amount (1008 Wh/day) is equal to or greater than the production plan (1000 Wh/day) designated by the production plan. In this case, the adjusting unit 160 determines that the production plan is satisfied, and adjusts the temperature that is the target operation amount MV to 105° C. Accordingly, the control apparatus 100 outputs 105° C. that is the temperature after adjustment to the control target 20.

It should be noted that in the above description, in the spring and autumn seasons, one example is shown, where the adjusting unit 160 adjusts the target operation amount from 113° C. to 100° C. as it is when the predicted production amount is equal to or greater than the production plan designated by the production plan. However, it is not limited to this. The adjusting unit 160 may further readjust the target operation amount when it is determined that the production plan is satisfied. Suppose that the adjusting unit 160, for example, estimates that the producible amount per hour of electricity becomes 30 Wh/hour when the temperature is changed to 90° C. by trial and error using the known relative equation. Suppose that then the adjusting unit 160 predicts that the producible amount per day of electricity becomes 720 Wh/day (=30 Wh/hour×24 hours). Even changing the temperature in this way, the predicted production amount (720 Wh/day) is equal to or greater than the production plan (700 Wh/day) designated by the production plan. In such a case, the adjusting unit 160 may further readjust the target operation amount MV, for example, may adjust the temperature to 90° C. that is further lower than 100° C. In this way, the control apparatus 100 can readjust, for example, the target operation amount MV in the range that satisfies the production plan to further suppress the wall thinning.

In this way, the control apparatus 100 according to the second modification example considers the production plan at the equipment 10 in adjusting the operation amount MV (AI). That is, the control apparatus 100 according to the second modification example adjusts the operation amount MV (AI) in the range that satisfies the production plan. In this way, the control apparatus 100 according to the second modification example can combine the longevity of the equipment 10 with compliance with the production plan.

Various embodiments of the present invention may be described with reference to flowcharts and block diagrams whose blocks may represent (1) steps of processes in which manipulations are performed or (2) sections of apparatuses responsible for performing manipulations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical manipulations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing manipulations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing manipulations specified in the flowcharts or block diagrams. Examples of processors include computer processors, processing units, microprocessors, digital signal processors, controllers, microcontrollers, etc.

Figure 7:
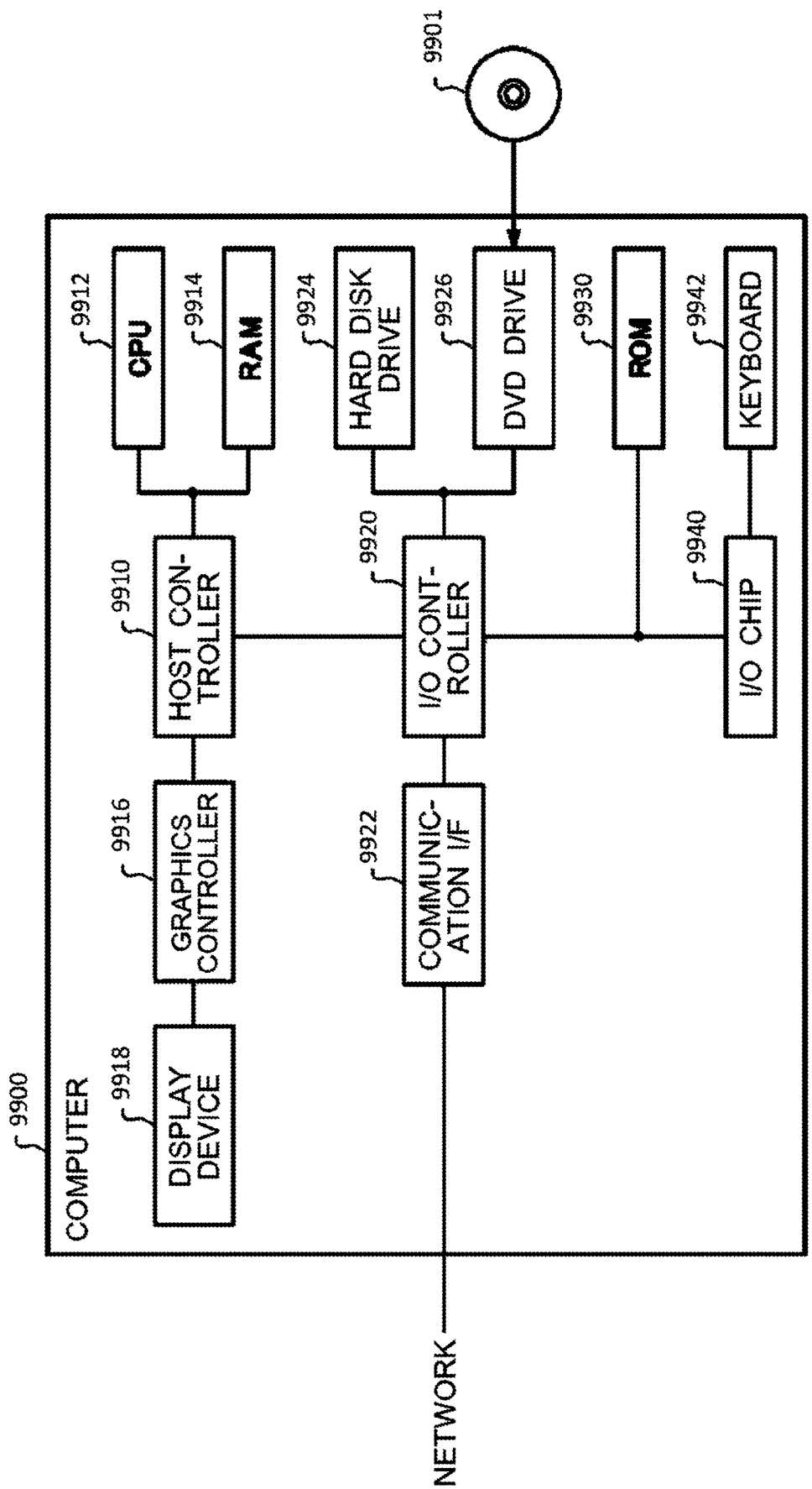
FIG. 7 illustrates an example of a computer 9900 in which a plurality of aspects of the present invention may be entirely or partially embodied.

FIG. 7 shows an example of a computer 9900 in which a plurality of aspects of the present invention may be entirely or partially embodied. A program that is installed in the computer 9900 can cause the computer 9900 to function as or perform operations associated with apparatuses of the embodiments of the present invention or one or more sections thereof, or perform the operations or the one or more sections, and/or cause the computer 9900 to perform processes of the embodiments of the present invention or steps of the processes. Such a program may be executed by the CPU 9912 to cause the computer 9900 to perform certain operations associated with some or all of the blocks of flowcharts and block diagrams described herein.

The computer 9900 according to the present embodiment includes a CPU 9912, a RAM 9914, a graphics controller 9916, and a display device 9918, which are mutually connected by a host controller 9910. The computer 9900 also includes input/output units such as a communication interface 9922, a hard disk drive 9924, a DVD-ROM drive 9926 and an IC card drive, which are connected to the host controller 9910 via an input/output controller 9920. The computer also includes legacy input/output units such as a ROM 9930 and a keyboard 9942, which are connected to the input/output controller 9920 through an input/output chip 9940.

The CPU 9912 operates according to programs stored in the ROM 9930 and the RAM 9914, thereby controlling each unit. The graphics controller 9916 obtains image data generated by the CPU 9912 on a frame buffer or the like provided in the RAM 9914 or in itself, and causes the image data to be displayed on the display device 9918.

The communication interface 9922 communicates with other electronic devices via a network. The hard disk drive 9924 stores programs and data used by the CPU 9912 within the computer 9900. The DVD drive 9926 reads programs or data from the DVD-ROM 9901, and provides the programs or data to the hard disk drive 9924 via the RAM 9914. The IC card drive reads programs and data from an IC card, and/or writes programs and data into the IC card.

The ROM 9930 stores therein a boot program or the like executed by the computer 9900 at the time of activation, and/or a program depending on the hardware of the computer 9900. The input/output chip 9940 may also connect various input/output units via a parallel port, a serial port, a keyboard port, a mouse port, or the like to the input/output controller 9920.

A program is provided by computer readable media such as the DVD-ROM 9901 or the IC card. The program is read from the computer readable media, installed into the hard disk drive 9924, RAM 9914, or ROM 9930, which are also examples of computer readable media, and executed by the CPU 9912. The information processing described in these programs is read into the computer 9900, resulting in cooperation between a program and the above-mentioned various types of hardware resources. An apparatus or method may be constituted by realizing the operation or processing of information in accordance with the usage of the computer 9900.

For example, when communication is performed between the computer 9900 and an external device, the CPU 9912 may execute a communication program loaded onto the RAM 9914 to instruct communication processing to the communication interface 9922, based on the processing described in the communication program. The communication interface 9922, under control of the CPU 9912, reads transmission data stored on a transmission buffering region provided in a recording medium such as the RAM 9914, the hard disk drive 9924, the DVD-ROM 9901, or the IC card, and transmits the read transmission data to a network or writes reception data received from a network to a reception buffering region or the like provided on the recording medium.

The CPU 9912 may also make all or required portions of the files or databases stored in an external recording medium such as the hard disk drive 9924, the DVD-ROM drive 9926 (DVD-ROM 9901) or an IC card to be read by the RAM 9914, and perform various types of processing on the data on the RAM 9914. The CPU 9912 may then write back the processed data to the external recording medium.

Various types of information, such as various types of programs, data, tables, and databases, may be stored in the recording medium to undergo information processing. The CPU 9912 may perform various types of processing on the data read from the RAM 9914, which includes various types of operations, processing of information, condition judging, conditional branch, unconditional branch, search/replace of information, etc., as described throughout this disclosure and designated by an instruction sequence of programs, and writes the result back to the RAM 9914. In addition, the CPU 9912 may search for information in a file, a database, etc., in the recording medium. For example, when a plurality of entries, each having an attribute value of a first attribute associated with an attribute value of a second attribute, are stored in the recording medium, the CPU 9912 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on the computer 9900 or near the computer 9900. In addition, a recording medium such as a hard disk or a RAM provided in a server system connected to a dedicated communication network or the Internet can be used as the computer readable media, thereby providing the program to the computer 9900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: equipment; 20: control target; 100: control apparatus; 110: state data acquisition unit; 120: operation amount data acquisition unit; 130: learning unit; 135: control model; 140: control unit; 150: prediction unit; 160: adjusting unit; 170: output unit; 410: adjusting history acquisition unit; 510: plan acquisition unit; 9900: computer; 9901: DVD-ROM; 9910: host controller; 9912: CPU; 9914: RAM; 9916: graphics controller; 9918: display device; 9920: input/output controller; 9922: communication interface; 9924: hard disk drive; 9926: DVD drive; 9930: ROM; 9940: input/output chip; 9942: keyboard

What is claimed is:

1. A control apparatus, comprising:
at least one processor;
a control unit, that uses the at least one processor to control a control target by a machine learned control model to thereby output an operation amount of the control target according to a state of equipment having the control target provided therein;
a prediction unit, that uses the at least one processor to predict a future state of the equipment;
an adjusting unit, that uses the at least one processor to adjust the operation amount based on a predicted result; and
an output unit, that uses the at least one processor to output an adjusted operation amount to the control target;
wherein
the prediction unit uses the at least one processor to predict a future maintenance cost of the equipment;
the adjusting unit uses the at least one processor to avoid operating conditions in which the cost for a suppressant for suppressing deterioration of the equipment increases; and
the operating conditions conducive to the deterioration of the equipment are learned by the machine learned control model.

2. The control apparatus according to claim 1, wherein
the prediction unit uses the at least one processor to predict a future state of health of the equipment; and
the adjusting unit uses the at least one processor to adjust the operation amount according to the state of health.

3. The control apparatus according to claim 2, wherein the state of health includes a remaining thickness of a plumbing in the equipment.

4. The control apparatus according to claim 3, wherein
the prediction unit uses the at least one processor to predict a future maintenance cost of the equipment; and
the adjusting unit uses the at least one processor to adjust the operation amount according to the maintenance cost.

5. The control apparatus according to claim 3, further comprising a learning unit that uses the at least one processor to generate the control model by machine learning.

6. The control apparatus according to claim 3, further comprising
a plan acquisition unit that uses the at least one processor to acquire a production plan in the equipment,
wherein the adjusting unit is that uses the at least one processor to adjust the operation amount based on a predicted result and a production plan.

7. The control apparatus according to claim 2, wherein
the prediction unit uses the at least one processor to predict a future maintenance cost of the equipment; and
the adjusting unit uses the at least one processor to adjust the operation amount according to the maintenance cost.

8. The control apparatus according to claim 2, further comprising a learning unit that uses the at least one processor to generate the control model by machine learning.

9. The control apparatus according to claim 2, further comprising
a plan acquisition unit that uses the at least one processor to acquire a production plan of the equipment,
wherein the adjusting unit is that uses the at least one processor to adjust the operation amount based on a predicted result and a production plan.

10. The control apparatus according to claim 1, wherein
the prediction unit uses the at least one processor to predict a future maintenance cost of the equipment; and
the adjusting unit uses the at least one processor to adjust the operation amount according to the maintenance cost.

11. The control apparatus according to claim 10, wherein the maintenance cost includes a cost of adding a suppressant for suppressing deterioration of the equipment.

12. The control apparatus according to claim 10, further comprising
a plan acquisition unit that uses the at least one processor to acquire a production plan in the equipment,
wherein the adjusting unit is that uses the at least one processor to adjust the operation amount based on a predicted result and a production plan.

13. The control apparatus according to claim 1, further comprising a learning unit that uses the at least one processor to generate the control model by machine learning.

14. The control apparatus according to claim 13, wherein the learning unit is that uses the at least one processor to generate, by reinforcement learning, the control model according to an input of state data indicating a state of the equipment so that an operation amount with a higher reward value determined by a predetermined reward function is output as a recommended operation amount.

15. The control apparatus according to claim 14, wherein the learning unit uses the at least one processor to further learn a constraint condition in the machine learning based on a history in which the operation amount is adjusted.

16. The control apparatus according to claim 13, wherein the learning unit uses the at least one processor to further learn a constraint condition in the machine learning based on a history in which the operation amount is adjusted.

17. The control apparatus according to claim 16, wherein the constraint condition includes at least one of upper or lower limit values of the operation amount.

18. The control apparatus according to claim 1, further comprising
a plan acquisition unit that uses the at least one processor to acquire a production plan in the equipment,
wherein the adjusting unit is that uses the at least one processor to adjust the operation amount based on a predicted result and a production plan.

19. A control method, comprising:
controlling a control target by a machine learned control model to thereby output an operation amount of the control target according to a state of equipment having the control target provided therein;
predicting a future state of the equipment;
adjusting the operation amount based on a predicted result; and
outputting an adjusted operation amount to the control target;

wherein
the predicting includes predicting a future maintenance cost of the equipment;
the adjusting includes avoiding operating conditions in which the cost for a suppressant for suppressing deterioration of the equipment increases; and
the operating conditions conducive to the deterioration of the equipment are learned by the machine learned control model.

20. A non-transitory recording medium having a control program recorded thereon, when executed by a computer including at least one processor, causing the computer to function as:

a control unit, that uses the at least one processor to control a control target by a machine learned control model to thereby output an operation amount of the control target according to a state of equipment having the control target provided therein;

a prediction unit, that uses the at least one processor to predict a future state of the equipment;

an adjusting unit, configured to adjust the operation amount based on a predicted result; and an output unit, that uses the at least one processor to output an adjusted operation amount to the control target;

wherein
the prediction unit uses the at least one processor to predict a future maintenance cost of the equipment;
the adjusting unit uses the at least one processor to avoid operating conditions in which the cost for a suppressant for suppressing deterioration of the equipment increases; and
the operating conditions conducive to the deterioration of the equipment are learned by the machine learned control model.

* * * * *